United States Patent
Hinkel et al.

(10) Patent No.: US 8,723,972 B2
(45) Date of Patent: May 13, 2014

(54) SURVEILLANCE SYSTEM

(75) Inventors: Ralf Hinkel, Hörringen (DE); Klaus Borchers, Otterbach (DE)

(73) Assignee: Mobotix AG, Kaiserslautern (DE)

( * ) Notice: Subject to any disclaimer, the term of this patent is extended or adjusted under 35 U.S.C. 154(b) by 1197 days.

(21) Appl. No.: 10/548,842

(22) PCT Filed: Mar. 10, 2004

(86) PCT No.: PCT/DE2004/000472
§ 371 (c)(1),
(2), (4) Date: Oct. 11, 2005

(87) PCT Pub. No.: WO2004/082287
PCT Pub. Date: Sep. 23, 2004

(65) Prior Publication Data
US 2006/0098100 A1    May 11, 2006

(30) Foreign Application Priority Data
Mar. 10, 2003   (DE) .................................. 103 10 635

(51) Int. Cl.
*H04N 5/232*   (2006.01)
*H04N 7/18*   (2006.01)

(52) U.S. Cl.
USPC ................. 348/211.13; 348/159; 348/211.11; 348/211.4; 348/211.8

(58) Field of Classification Search
USPC ................... 348/153, 207.11, 211.11, 211.13, 348/211.4, 211.5, 211.8
See application file for complete search history.

(56) References Cited

U.S. PATENT DOCUMENTS

| | | | |
|---|---|---|---|
| 6,930,709 B1 * | 8/2005 | Creamer et al. | 348/211.3 |
| 7,365,772 B2 * | 4/2008 | Mizutani et al. | 348/211.5 |
| 2002/0097322 A1 | 7/2002 | Monroe et al. | 348/159 |
| 2002/0175995 A1 | 11/2002 | Sleeckx | 348/143 |
| 2003/0041329 A1 | 2/2003 | Bassett | 725/105 |
| 2004/0024876 A1 * | 2/2004 | Ito et al. | 709/226 |

FOREIGN PATENT DOCUMENTS

| | | | |
|---|---|---|---|
| DE | 102 61 501 | 7/2004 | |
| JP | 2003158521 A * | 5/2003 | ............. H04L 12/28 |
| WO | WO 01/13637 | 2/2001 | |

OTHER PUBLICATIONS

JP-2003158521translation.*

* cited by examiner

*Primary Examiner* — Fan Zhang
(74) *Attorney, Agent, or Firm* — Faegre Baker Daniels LLP

(57) ABSTRACT

A surveillance system with cameras, monitors and a connection medium. Provided in this connection are a response code memory for the storage of response codes by which image data can be retrieved by cameras and response code generation media which are allocated to the monitors and generate response codes which indicate which cameras should retrieve image data, whereby the connection medium is designed for the purpose of through-connecting image data to the monitors in response to the response codes generated by the response code generation media allocated to the monitors.

32 Claims, 1 Drawing Sheet

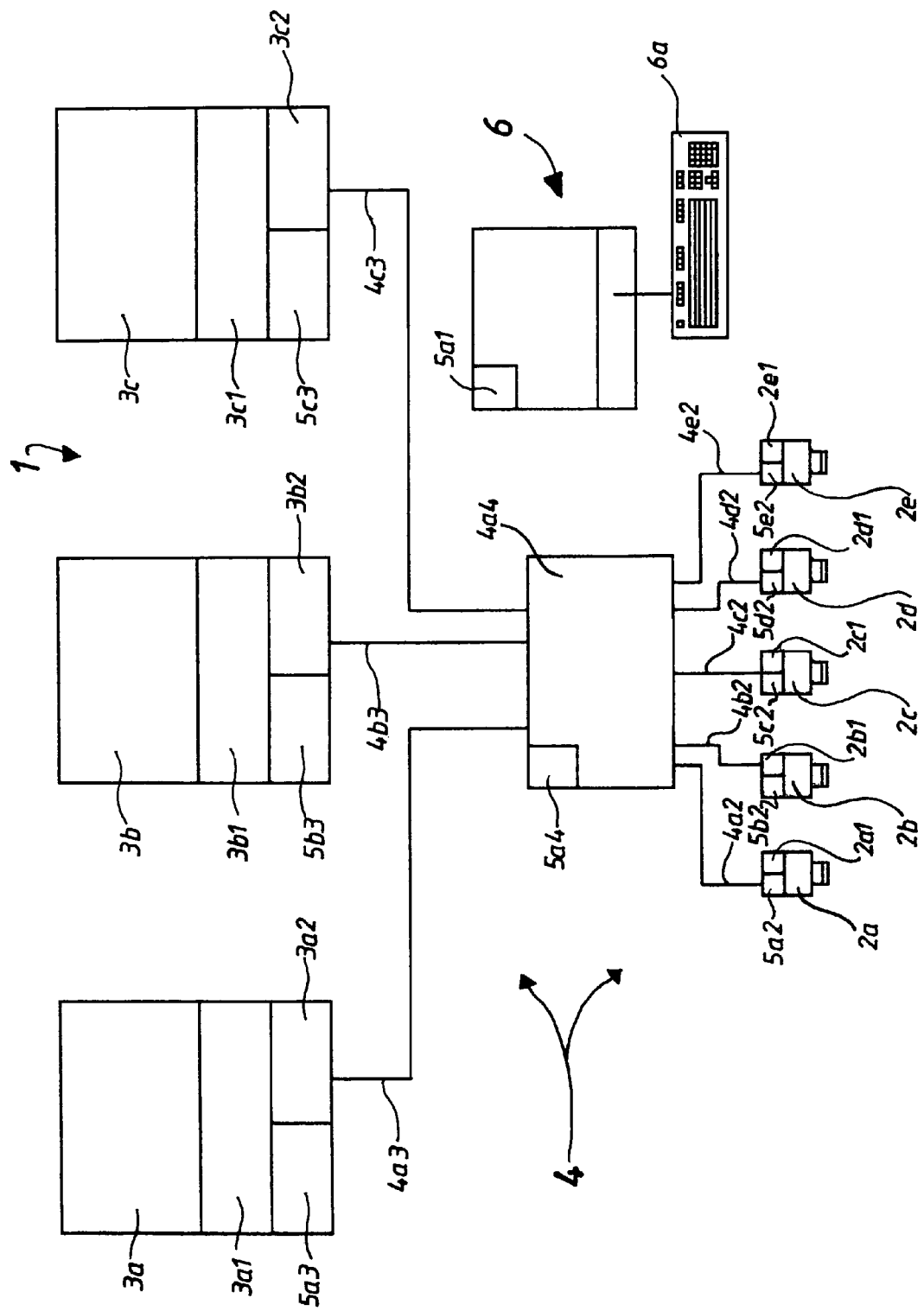

SURVEILLANCE SYSTEM

BACKGROUND

The present invention relates to the subject matter claimed in the generic part of the patent and consequently concerns itself with surveillance systems.

Surveillance systems for large building complexes such as penal institutions, airports, department stores etc. comprise as a rule a multitude of cameras which supply pictures of different areas and premises in the building, as well as a control station with a multitude of monitors, on which the respective pictures are to be displayed.

It is necessary to link the multitude of image-supplying cameras and the multitude of monitors to each other. Up to now this has required crossbars and the like. The modification of the arrangement in the case of such crossbars is not only inflexible, but rather also typically can be managed only at great expense.

Additionally already known is the provision of a great number of digital cameras for surveillance and also observation of a great number of different places. In this connection however, there is the problem that typically the images flow together on a PC, which in the case of a great number of cameras and the typically high image resolutions desired for surveillance purposes results in a massive network burden or the need for very high bandwidth.

It is desirable to design a surveillance system in such a way that at least some of the mentioned disadvantages are alleviated at least partially.

SUMMARY

The object of the present invention consists in providing something novel for industrial application.

The solution of this problem will be claimed in independent form. Preferred embodiments are to be found in the dependent claims.

The present invention consequently proposes in a first basic idea a surveillance system with cameras, monitors and a connection medium for them, in which it is provided that it comprises a response code memory for the storage of response code, from which image data can be retrieved by cameras, as well as resources for generating response codes which are allocated to the monitors and which generate response codes that indicate from which cameras image data is to be retrieved, whereby the connection medium is designed for the purpose of through-connecting image data to the monitors in response to the response codes generated by the means of response code generation allocated to said monitors.

A first significant aspect of the present invention consists hence in designing the surveillance system in such a way that the image data transmission takes place using the response codes which are stored for each camera, whereby the monitors generate these response codes as required for displaying the desired images. Thus in an exemplary configuration of the surveillance system first a response code is virtually allocated to a camera, said response code is stored and then only one corresponding response code is generated by the monitor for the purpose of determining on which monitors or on which single monitor an image or images of this camera is/are to be displayed. The monitor will typically transmit this response code to the connection medium and from there a through-connection to the corresponding camera will take place.

The entire arrangement can comprise a control station medium which in particular is provided with a controller, in order to determine from there which cameras or other image sources should be connected respectively with a specified monitor. Explicit mention is made of the usability of other image sources besides cameras. For example, it is possible in airports in the detection of persons who seem suspicious to display their image on a first monitor and display comparison images from a database on an adjacent monitor, in order to more rapidly permit a comparison between databases of wanted persons and the persons who are actually being observed.

It is also possible in the surveillance of industrial processes to display actual processes next to target runs so that errors can be more rapidly detected. Mention is made of the fact that in such cases, additional information can be included in the display, for example information about whether it is live footage, recordings, database information etc. This additional information can come from the respective data source such as the camera, the database server, a local hard drive allocated to the monitor and/or can be transmitted parallel or intermittently nested or serially to the image data to be displayed by a control station medium via a network.

It is possible to design the control station medium for the purpose of transmitting a control response code to the monitors in order to communicate to said monitors which camera should have its image data displayed on the monitor. This requires that the control station medium on the one hand possess information about the corresponding code of a camera, that is a corresponding response code memory is provided in the control station medium and/or can be addressed by said control station medium, and that on the other hand access to a code of the monitors is possible for the control station medium either by means of integration of a monitor code memory and/or access to a monitor code memory is possible externally from the control station medium.

It is possible that the control station media are constructed on and/or with a PC, a workstation, as a server etc. in each case with a network adapter. Convention components can be used, which are available and in case of damage can be rapidly replaced at a reasonable price without problems. A network adapter on the control station medium does not have to be designed for the full transfer rate of all image data from all of the cameras in the maximum resolution form. Instead it can be sufficient if each network adapter is designed to be able to transmit only part of the image data simultaneously; even in the case of high image resolution this is already possible with low expenditure in accordance with today's technology.

The cameras will typically supply digitized images and in particular will be designed as web cameras. Explicitly emphasized here is the fact that it is possible to use a multi-camera built of individual cameras and/or comprising such, as follows from the application of the present applicant submitted at the same time which is included here in its entirety for disclosure purposes. Additionally it is possible to combine different cameras in one surveillance device, thus for example to monitor large spaces with multi-camera media, individual places with permanently installed individual cameras, only sporadically visited regions with swiveling cameras, which can exhibit in particular variable focal distances, and/or provide double camera systems in other regions which can exhibit a fixed focal range with a firmly mounted overview camera and a swiveling camera with variable focal distance. Mention is made of the possibility of compressing image data, in particular when they are being supplied in digital form. Mention is also made of the fact that the image data can be compressed etc. dependent on current changes, as regions particularly relevant in the respective accessible image range or less relevant regions. In this connection reference is made to DE 102 61 501.2, which is being included in its entirety here for disclosure purposes.

The surveillance device can exhibit as monitors in particular those with local intelligence, which are designed for the reception and the display of digital images, for which purpose the monitors in particular can be equipped with web browsers in standard formats. Explicit mention is made of the fact that in such a case the term "monitor" is used, in order to make reference to units such as standard PCs connected with monitors which are correspondingly equipped to receive digital image data via a network connection and to prepare said image data for representation on a graphic display, thus a monitor in the conventional sense.

A response code memory can be provided and is preferred in each monitor, each camera, each connection medium and/or each central control medium. It is in particular possible to design the response code memory for storage of response codes as a network address, in particular as an IP address, in particular as a dynamically allocated IP address. In such a case in the connection of a camera, which is then designed as a web camera, to a network, said camera will automatically log on to the network. With dynamic address allocation it is ensured that regardless of the number of cameras already integrated on the network the newly connected camera does not receive an IP address which has already been allocated and it will then be possible to address this camera using the hence unambiguous IP address. By communicating to a monitor afterwards that there are images to be displayed by the camera with the newly allocated IP address, the representation of the images supplied by this camera in the control station is immediately possible. With this a very rapid expandability and/or easy exchangeability of defective cameras or other components comes into being. It is also possible in similar fashion to replace, additionally provide etc. monitors or the units with local intelligence that are allocated to them, to which a respective IP address is allocated. While beforehand reference was made to the fact that the local intelligence can be provided by dedicated PCs or the like, mention is made of the fact that that instead of that the possibility also exists of providing an embedded PC or the like with minimal functionality, e.g. dedicated ASICS or the like on a monitor.

The connection medium will typically comprise a network cable, such as a local, small-area network (LAN), a radio network, a WAN, remote data transmission cables such as ISDN etc. as well as a network switch. It is emphasized here that combinations of different connection medium or network cables such as LAN and WLAN are possible, for example to send radio signals or a previously provided node to the control station from remote lying cameras to which no cable is routed or to which no cable has yet been routed and to receive signals from installed units via in particular network cables capable of broad band. The provision of cameras connected via radio makes it possible in particular to make expansions rapidly when needed, for example if large events require the opening of additional entries of the building which normally remain closed, in order to perform a short-term auxiliary surveillance in industrial buildings of current problem areas such as internal construction sites, machines with unexpectedly high, suddenly increasing frequency of accidents etc. or to monitor alternating places for theft. Also the lower transfer rates typically transferable via radio can be sufficient for transmitting images with high resolution without trouble, in particular if the referenced compression method for image data disclosed in the patent which is suitable here is used.

Mention is made of the fact that the connection medium typically will not transmit image data exclusively, but rather in particular also response codes and/or control codes which can be provided in particular between cameras, monitors and/or a control station medium that will be present if necessary. Mention is also made of the fact that cameras which address each other can, if desired also be preset locally on the respective monitor.

The control codes can also comprise failure notices and error messages.

Mention is made of the fact that patent protection is also claimed for a method in which a multitude of cameras and monitors are allocated code addresses, in particular IP addresses and a switching of different cameras to specified monitors takes place via a standard network switch and/or, providing there is corresponding transferability, if necessary also a standard network router, in general manner as well as in the special forms resulting from this.

BRIEF DESCRIPTION OF THE DRAWINGS

The invention will be described in the following only by way of example with the help of the drawing. The FIGURE shows the following:

FIG. 1 shows a surveillance system in accordance with the present invention.

DETAILED DESCRIPTION

According to FIG. 1 a surveillance system 1 comprises cameras 2, monitors 3 and connection medium 4 for them, whereby in the surveillance system 1 additional response code memory 5 is provided for the storage of response codes, via which image data can be retrieved from cameras 2 via the connection medium 4, and response code generation media 3$a$1, 3$b$1, 3$c$1 etc is provided, said response code generation media being allocated to the monitors 3 and which generate response codes indicating from which cameras 2 image data are to be retrieved, and whereby the connection medium 4 is designed for the purpose of through connecting image data to the monitors 3 in response to the response codes generated by these allocated response code generation media 3$a$1, 3$b$1, 3$c$1.

The surveillance system 1 is in the present example a control station with a very large number of monitors, of which for reasons of simpler representation only three are shown, upon which images from a multitude of cameras 2, of which only five cameras 2$a$, 2$b$, 2$c$, 2$d$, 2$e$ are drawn, can be displayed for the purpose of building surveillance. The control station exhibits in addition to the monitors 3 a control medium 6, which serves the purpose of specifying which camera image of the cameras 2$a$, 2$b$, 2$c$ etc. should currently be displayed on which of the monitors 3$a$, 3$b$, 3$c$ etc.

In the case of the cameras 2 it is a matter of digital web cameras via which an IP address to be dynamically routed by the control medium 6 can be addressed and which, when they are addressed, output image data in a format that can be read by a standard browser to the address to which they are supposed to output said image data, in particular as a rule as here to the address from which the request originates. The web camera is, for this purpose, connected via cables, which constitute part of the connection medium, to a network switch 4$a$4 belonging to the connection medium as a node with sufficiently high number of inputs and outputs as well as sufficient bandwidth. Shown are connections via network cables 4$a$2, 4$b$2, 4$c$2, 4$e$2, which run from the cables from the cameras 2 to the node 4$a$4. The cables have a sufficient bandwidth for the transmission of image data from a camera system which in particular, as is the case with camera 2b, is a multi-camera system. Emphasis is made of the fact that alternatively radio link connections, remote data transmission cables etc. can also be part of a connection link and/or can completely form said connection link. The individual camera 2, in addition to a unit 2a1 or 2b1, 2c1, 2d1, 2e1 for image data compression and preparation also exhibits a response code memory where the response code dynamically allocated by control medium 6 of the respective camera is stored as an IP address. This response code memory medium in the camera is termed as 5a2 (camera 2a), 5b2 (camera 2b) etc.

The monitors 3 comprise a response code memory 5a3, 5b3, 5c3 etc., in which an IP address, by which the respective monitor can be addressed via a standard IP protocol, can be dynamically stored. Additionally an interface 3a2, 3b2, 3c2 etc. for the connection with the switch medium 4a4 via corresponding cables 4a3, 4b3, 4c3, which are conventional LAN cables, and further a response code generating medium 3a1, 3b1, 3c1 are present, in order to output via the connection media 4 respective response codes from those cameras from which image data are to be retrieved. The response code memory 5a3, the response code generation medium 3a1 and the interface 3a2 can be part of an integrated, in particular embedded PC electronic circuit, which exhibits all the necessary minimum functionalities for the monitors 3 including a browser functionality for the decoding and display of image data received from web cameras, but is preferably formed as the memory of a conventional PC with a interface, minimum memory and a browser program via which remote control data retrieval can be triggered.

The connection means 4 comprises, in addition to the connection cables already mentioned a switch 4a4 in conventional network design. The fact that security increasing arrangements can be provided such as interrupt-free power supplies, which can also be allocated to the monitors, the control medium 6, as well as media for redundant etc., and/or the fact that an implementation is even possible by means of sufficiently fast routers, is only disclosed to complete the picture.

However, in the represented variant the switch is designed in such a way that it comprises a response code memory 5a4 in which information is stored as to which of the devices connected to respective terminals can be addressed by which response code, i.e. which IP address and how the currently desired connections are running. In other words the response code memory 5a4 of the switch has information stored in it about which IP address monitor 3a1 is to be addressed by, which IP address monitor 3b1 is to be addressed by etc. and information about which IP address the cameras 2a, 2b, 2c as well as the control medium 6 are to be addressed by. This is a conventional functionality in the case of switches available in the state of the art and the switch can consequently be conventional in its entirety, provided the appropriate bandwidth and/or number of terminals are present.

Additionally the switch is connected to the control medium 6, which in the represented variant is a standard PC, from which it can be determined with a suitable software program on which monitor 3a, 3b, 3c the image of which camera 2a, 2b . . . is to be displayed and which is designed for the purpose of outputting a signal relating to this to each monitor to be addressed after a corresponding determination and to cause said monitor in its response code generation medium to generate a respective response code and output said response code via its cable 4a3, 4b3, 4c3 etc. to the switch 4a4 central to the control station so that said control station through connects the respective monitor to the corresponding camera 2a, 2b, 2c etc. or the cameras as necessary and from said camera or said cameras in response to the reception of the response code from the respective monitor outputs image data to said monitor as required. In the process, while it is true that a great deal of image data flows via the switch 4a4, but the individual bandwidth can be kept as low as possible for representation of the image data to be displayed on the monitor. Emphasis is made of the fact here that it is possible to represent more than the image data from only one camera on a monitor and that image data from a camera are to be fed to more than one monitor, if desired.

From the above it is obvious that response codes in the surveillance device are stored in a multitude of places, namely on the one hand in the monitors, on the other hand in the control media, additionally in the cameras and finally, in suitable form, in the connection switch.

The surveillance device in accordance with the present invention is used in the following way:

First a network is laid consisting of conventional LAN cables, which typically already exhibit a sufficiently high bandwidth. Then web cameras are connected to these cables and a multitude of monitor PCs equally close to each other are set up for a control station display. Close to this monitor PC partially forming the control station the control medium 6-PC is provided. All cables are connected to the switch 4a4 and at the control medium 6-PC dynamic IP addresses are allocated to all the connected devices. Now the control medium 6-PC is used to determine which camera images are to be placed on which monitor. For this purpose, if desired, a severely compressed miniature image of each camera can be fed to the control medium 6-PC and displayed there. This does not result in a considerable additional network burden, nor does it result in a burden on the supply cable to the control medium 6-PC. After the successful allocation by means of input on the keyboard 6a a corresponding signal is sent to the respective monitors 3, which indicates from which camera image data are to be requested and displayed. The monitors for their part generate a response code, for example a browser command, with which the camera is addressed, in order to supply image data. This response code can comprise additional parameters, such as for example a desired resolution, image rates etc., which if necessary can be permanently set on the respective monitor and/or preset by control medium 6.

The generated response code is received by the switch, the address is evaluated, determined on which terminal the IP address dynamically allocated at system startup and/or startup of the camera in response to its logon to the system is offered and then a corresponding connection to the requesting monitor is established. After this procedure is completed, the desired images are continuously displayed on the respective monitors without too high of a bandwidth resulting on any single cable. The control medium accordingly informs the monitor which camera it is to get the images from. The monitor, which has received this control signal from the control medium, converts it as necessary and then itself requests the images from the camera assigned to it. Itself means that the image data no longer have to be routed via the control medium, but rather by the camera via a data cable to the switch and from there directly to the requesting monitor (or by the PC controlled by the control medium or the like). When this happens with a multitude of cameras and monitors, large quantities of image data run only to the switch, through it and away from it, which is non-critical since it is designed for this; the control medium and the cable to the control medium are accordingly not overwhelmed by the image data streams or burdened in some other ways, provided e.g. compressed miniature images are not transmitted for installation purposes or something similar. Mention is made of the fact that the control medium can also be used as an individual monitor. The only truly necessary burden on the control medium comes through the sending of the control signals to the requesting monitors, i.e. on the cable between the switch and the control medium only a very slight data quantity flows and not the high volume of all the image data. This makes the design of the system simpler and more reasonably priced.

If an individual camera and/or a monitor breaks down during operation, this can be removed from the system and replaced without difficulties. The newly connected monitor or the newly connected camera receives its dynamic IP address when it is logged on to the network and after that can again be addressed immediately. Mention is made of the fact that a response code can not only take place via the IP address, but rather also via a dedicated name ("Monitor 7", "Camera 19"). Mention is also made of the fact that data storage can take place on the monitor, on the camera and/or on a central data system, in order to store individually monitored images and/or image sequences and/or complete image sequences. In the storage of all of the images of all of the cameras at a high resolution it can be necessary to provide such a memory medium with an individual cable with higher bandwidth, which however will not significantly burden the overall costs of a complete system.

Mention is made of the fact that image data can be transmitted continuously as image data streams with or without additional information until a new addressing of camera and/or new allocation of the monitor without additional measures, as well as the usability of data formats such as JPEG, MPEG or the like for the image data streams and the transmissibility of the image data streams with regard to transmitted formats, sizes, sections, compression ratios etc. of characterizing and/or specified parameters in particular with the response codes and/or the control code sent by the control medium to the monitors as control information. Mention is further made of the fact that even coded security information for the prevention of an unauthorized access and/or replacement of the camera can be included in the transmission.

The invention claimed is:

1. A surveillance system, comprising:
   a plurality of cameras;
   a plurality of monitors having addresses within the system;
   a connecting medium connecting the cameras to the monitors and having a plurality of lines; and
   a control medium for assigning an IP address unique within the system to each camera as a response code by which image data can be retrieved from the cameras;
   each camera being adapted to store a respective said response code;
   the control medium being adapted to transmit an IP address uniquely assigned to a camera to a given monitor, the given monitor being adapted to request at said IP address transmitted by the control medium transmission of image data from the associated camera;
   the associated camera being adapted to transmit the image data requested by the respective given monitor to the address of the respective given monitor via one or more lines of the plurality of lines through-connected from the associated camera to the respective given monitor.

2. A surveillance system in accordance with claim 1, wherein the control medium is designed for the purpose of passing the response codes of the cameras, whose image data are to be displayed on a monitor, to those monitors which are to request the image data, and wherein the control medium includes response code generation media allocated to the monitors that are designed for the purpose of outputting the response codes of the cameras which are allocated to them by the control medium in response to the response codes generated and received by the control medium in order to request in this way the required image data for display from the cameras allocated to them.

3. A surveillance system in accordance with claim 2, wherein the control medium is formed on and/or with a computer with a network adapter, wherein the network adapter is designed for the purpose of transmitting at least the response codes.

4. A surveillance system in accordance with claim 2, wherein the cameras supply digital images and are designed as web cameras.

5. A surveillance system in accordance with claim 2, wherein the monitors are designed for the reception and display of digital images in web standard formats which can be displayed by conventional browsers.

6. The surveillance system of claim 2, wherein each camera IP address is dynamically allocated to its respective camera.

7. A surveillance system in accordance with claim 1, wherein the cameras supply digital images and are designed as web cameras.

8. A surveillance system in accordance with claim 7, wherein the monitors are designed for the reception and display of digital images in web standard formats which can be displayed by conventional browsers.

9. The surveillance system of claim 7, wherein each camera IP address is dynamically allocated to its respective camera.

10. A surveillance system in accordance with claim 1, wherein the monitors are designed for the reception and display of digital images in web standard formats which can be displayed by conventional browsers.

11. A surveillance system in accordance with claim 1, wherein the response codes are dynamically allocated.

12. A surveillance system in accordance with claim 1, wherein the connecting medium comprises network cables and at least one network switch into which image data enter and from which image data are output.

13. A surveillance system in accordance with claim 1, wherein the connecting medium is designed in such a way that the data transmission follows a standard network protocol.

14. A surveillance system in accordance with claim 1, wherein the control medium is formed on and/or with a computer with a network adapter, wherein the network adapter is designed for the purpose of transmitting at least the response codes.

15. A surveillance system in accordance with claim 14, wherein the cameras supply digital images and are designed as web cameras.

16. A surveillance system in accordance with claim 14, wherein the monitors are designed for the reception and display of digital images in web standard formats which can be displayed by conventional browsers.

17. The surveillance system of claim 1, wherein each camera IP address is dynamically allocated to its respective camera.

18. The surveillance system of claim 1, wherein a response code memory is provided in all at least one of the monitors, the connecting medium and/or a central control medium.

19. A surveillance system, comprising:
    a plurality of cameras;
    a plurality of monitors;
    each camera and monitor having a unique address within the system;
    a connecting medium connecting the cameras to the monitors and having a plurality of lines; and a control medium for configuring which monitor is to be connected to which camera or cameras, the control medium being adapted to inform a given monitor to be configured to show images data of the camera or cameras by the control medium about the camera or cameras the monitor has to show images of by transmitting the unique address or addresses of the camera or cameras the monitor is being configured to show images of by the control medium to the given monitor, the given monitor being adapted to request via said unique address or addresses transmitted by the control medium transmission of image data from the associated camera or cameras;

the associated camera being adapted to transmit the image data requested by the respective given monitor to the address of the respective given monitor via one or more lines of the plurality of lines through-connected from the associated camera to the respective given monitor by said connecting medium.

20. A surveillance system in accordance with claim 19, wherein the cameras supply digital images and are designed as web cameras.

21. A surveillance system in accordance with claim 19, wherein the monitors are designed for the reception and display of digital images in web standard formats which can be displayed by conventional browsers.

22. A surveillance system in accordance with claim 19, wherein the connecting medium comprises network cables and at least one network switch into which image data enter and from which image data are output.

23. A surveillance system in accordance with claim 19, wherein each of the unique addresses of the cameras is a response code by which image data can be retrieved from the respective camera.

24. A surveillance system in accordance with claim 23, wherein the control medium is designed for the purpose of passing the response codes of the cameras, whose image data are to be displayed on a monitor, to those monitors which are to request the image data, and wherein the control medium includes response code generation media allocated to the monitors that are designed for the purpose of outputting the response codes of the cameras which are allocated to them by the control medium in response to the response codes generated and received by the control medium in order to request in this way the required image data for display from the cameras allocated to them.

25. A surveillance system in accordance with claim 23, wherein the response codes are dynamically allocated.

26. A surveillance system in accordance with claim 23, wherein the control medium is formed on and/or with a computer with a network adapter, wherein the network adapter is designed for the purpose of transmitting at least the response codes.

27. A method of operating a surveillance system, the method comprising:

assigning an IP address unique within the surveillance system to each of a plurality of cameras as a response code by which image data can be retrieved from the respective camera;

determining, using a control medium, which of a plurality of monitors is to show images from which camera or cameras, each of the plurality of monitors having a unique address within the surveillance system;

configuring, using the control medium, which monitor is to be connected to which camera or cameras; and transmitting, from the control medium to at least one of the plurality of monitors, the IP address or addresses of the camera or cameras the at least one of the plurality of monitors is being configured to show images of, so as to cause the at least one monitor to request image data from the associated camera or cameras at the transmitted IP address or addresses, and so as to further cause the associated camera or cameras to transmit the requested image data to the address or addresses of the at least one monitor via one or more of a plurality of lines of a connecting medium that are through-connected from the associated camera or cameras to the at least one monitor.

28. A method in accordance with claim 27, wherein the cameras supply digital images and are designed as web cameras.

29. A method in accordance with claim 28, wherein each camera IP address is dynamically allocated to its respective camera.

30. A method in accordance with claim 27, wherein the monitors receive and display digital images in web standard formats which can be displayed by conventional browsers.

31. The method of claim 27, wherein each camera IP address is dynamically allocated to its respective camera.

32. A method in accordance with claim 27, wherein the connecting medium comprises network cables and at least one network switch into which image data enter and from which image data are output.

* * * * *